June 18, 1935.    S. SPECHT    2,005,011
MAGNETIC TESTING APPARATUS AND METHOD
Filed Sept. 29, 1933
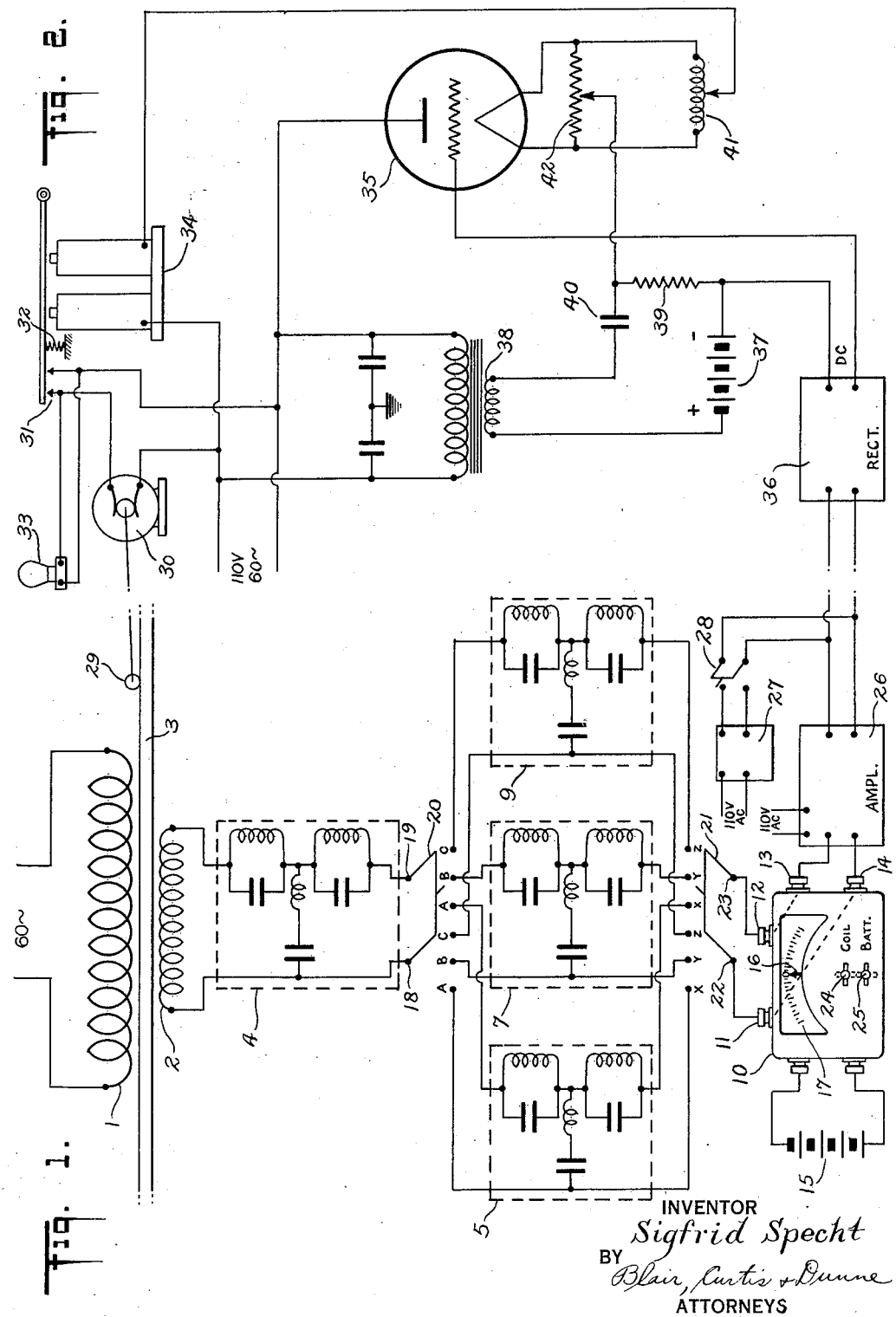
INVENTOR
Sigfrid Specht
BY
Blair, Curtis & Dunne
ATTORNEYS Patented June 18, 1935

2,005,011

UNITED STATES PATENT OFFICE 2,005,011

MAGNETIC TESTING APPARATUS AND METHOD

Sigfrid Specht, Fieldston, N. Y., assignor to Ferrous Magnetic Corporation, New York, N. Y., a corporation of New York Application September 29, 1933, Serial No. 691,432

15 Claims. (Cl. 175—183)

The present invention relates to an improvement in apparatus for and method of magnetic testing, one object thereof being to provide a selective device and technique which to a material extent simplify the procedure and increase the accuracy and reliability of the observed test results.

According to certain known magnetic testing practice, a measure of the permeability of the specimen is obtained by a dynamometer located in the secondary circuit of an induction device. This result however reflects only the aggregate quantitative effect of all of the properties and/or characteristics of the test piece and is therefore not selective. Where a standard is placed in one induction device and a specimen in another like device simultaneously energized by the same E. M. F., and the secondaries are connected in bucked relation, a dynamometer located in the secondary circuit discloses a measure of the difference, if any, between the standard and the specimen only in respect to their permeability and is therefore not selective.

In other magnetic testing methods involving direct comparison of a specimen with a standard, an oscillograph is located in circuit with the bucked secondaries of two like induction systems and produces wave form images of the differential current therein developed. The occurrence of certain irregularities in the image so produced is attributed to the presence of a difference between the standard and the specimen in respect to some identifiable property or characteristic thereof; and the extent of the irregularity is taken as a measure of the degree to which the specimen differs from the standard as to the corresponding property or characteristic. This is a selective method which, under favorable circumstances and with expert supervision, produces valuable results and, under other conditions, presents important difficulties.

The favorable circumstances above referred to include (1) the possession of a substantially perfect standard of known properties and characteristics which remain constant and (2) the use of that standard in testing pieces of substantially the same general characteristics, as for example, metal from the same heat and/or having the same chemical composition, or having had the same general history of physical treatment or conditioning.

The standard usually employed in the practical use of this method is one which presents, as nearly as may be ascertained without destructive tests, an acceptable piece for its intended ultimate use. The actual amount of segregations or inclusions, the degree of strain, the extent of decarbonization, etc. are not accurately known. Accordingly when a specimen is directly compared magnetically with such a standard in an induction apparatus which produces a wave form image of the resulting differential secondary, said wave form image may present irregularities of practically identical appearance under such widely differing conditions as where the segregations, for example, are wholly in the standard, or partly in the standard and partly in the specimen or entirely in the specimen. Thus, in the absence of a standard whose properties and characteristics are quantitatively known, the method now under consideration presents opportunity for deriving erroneous conclusions from the test results.

In using the differential method above discussed, the relative positions of the wave form image irregularities are relied upon in many cases not only to identify the characteristic or property as to which a variation is indicated but also to afford a guide in setting or calibrating the signalling or marking devices. So long as the tested pieces and the standard are generally of the same or very similar type, as to composition, history of treatment, etc., conclusions derived from the relative position of a given irregularity in the wave form image are fairly reliable. However, after the test or signal apparatus has been set to operate in relation to a standard produced under certain conditions, if specimens are presented for test which have a different history, altho of the same size and outward appearance, the test indications may be quite different from those observed in respect to specimens having the same history as the standard. In some cases this result is due to a change in the phase relation between the secondary output and the energizing current occasioned by the occurrence of eddy currents differing in character or value from those set up by the other type of specimen. With a different phase relation between the magnetizing current and the secondary, the shapes and/or relative positions of the wave form image irregularities may be expected to change, or some may disappear, or others may appear in different relation to the wave form image as a whole. Unless the operator understands what the difficulty is, he cannot correct it; and in most instances, the situation requires the selection of a new standard and an entirely new recalibration, or the employment of compensating devices. In any event testing is delayed until the trouble can be remedied and the use of compensating devices involves the danger of blanketing or distorting important diagnostic indications.

Another objection to the use of a standard in the testing of magnetizable objects, is that some of its characteristics change during prolonged testing, as in production operations, due to heating in the primary induction coil. This has been partly overcome by using cooling appliances with a corresponding complication of the apparatus.

It has also been proposed, for the purpose of avoiding errors due to heating of the standard, to substitute in place of the variable effect thereof in the secondary output, a substantially equivalent, but more constant force in the form of a current having a synthetic wave form i. e. a current having a synthetic wave form in which the component harmonics are selected and proportioned in quantitative effect to reproduce or approximate in the aggregate wave form and value which would be produced in a secondary by the standard under similar test conditions. Insofar as such a method involves the use of phase shifters, transformers or the like, it presents the disadvantage of introducing into the secondary output certain wave form peculiarities related to properties of the armature or core materials as well as variations due to heating of the transformer core during extended use. Furthermore, re-actance and inductive effects due to the presence of coils in the secondary circuit tend to produce phase conditions and relations which can readily obliterate or seriously impair manifestations of wave form variation due solely to changes or variations in respect to properties of the tested material. For example, with a current of synthetic wave form impressed on the secondary circuit, the induction device becomes in effect a step down transformer with the result that flux conditions in the field containing the test specimen represent not merely the effect of the sine wave primary magnetizing current but a composite of that effect plus the effect of the synthetic current operating through the secondary coil.

A further difficulty experienced in magnetic testing according to certain known methods is the distortion of the wave form of the induced secondary current caused by "end effect". This is particularly embarrassing in comparative methods in which the specimen, as a rod, tube, etc. is moved through the test coil because, while the standard remains stationary and affects the field without end effect, the end portions of the specimen, in some instances 18 to 24 inches thereof, in the case of tubes, introduce flux variations due chiefly to end effect, so that the resulting differential secondary wave form images disclose variations unrelated to those properties of the tested piece as to which information is sought. These variations are frequently of such magnitude and of such phase relation as to practically obliterate the wave form image components related to variation between the specimen and the standard in respect to the physical properties thereof.

It has further been ascertained that diagnostic conclusions based upon wave form irregularities having significance by reason of their phase relation cannot be relied upon because of the very pronounced phase altering effect of variations in strain or stress in the tested material, these being frequently sufficient to blanket indications of other defects or properties.

Having in mind the above stated difficulties and insufficiencies, as well as others, encountered in actual experience with the wide variety of known magnetic testing practice, it is one of the more specific objects of my invention to provide a method and apparatus which is capable of disclosing the presence in a tested specimen of various properties and/or characteristics thereof together with a measure of the extent or degree to which each is found, not however in terms of a difference between the specimen and a standard either actual or hypothetical in respect to such property, but in terms of an absolute value referred to zero of such property in each tested piece or portion thereof. This inventive concept presents the selective feature lacking in some of the known methods and, in the manner of its embodiment and practice, avoids the difficulties experienced in other known methods intended to be selective.

For the purposes of my invention I utilize the discovery or hypothesis that each property or characteristic, as hardness, decarbonization, strain, segregation etc. of a given material when located in a magnetic field produces a corresponding or distinguishing effect on the magnetic flux, which effect takes the form of a certain harmonic produced in and related to or forming one of the components of the output of a secondary coil suitably located in the field. When the field is developed by a pure sine wave current of 60 cycles or other suitable frequency applied to the primary of a suitable induction system which includes a secondary, such effects are reflected or indicated by the presence in the secondary output of corresponding harmonics of known or ascertainable frequency; superposed upon the 60 cycle or other frequency used; and the values of forces necessary to be interposed in or applied to the secondary output to segregate or select the several harmonics thereof from the sine wave and from each other may be calculated from Fouriers' series and embodied in suitable filters for the purpose. Accordingly, for each or any selected property or characteristics of a specimen, I am able to segregate a component of the secondary output corresponding thereto, and to obtain directly an indication of the occurrence and/or a measure of the effective E. M. F. of said component, thus gaining advantages in operation over test methods wherein an indicating device reflects only the average value or effective E. M. F. of the whole output and are therefore not selective, and/or methods wherein the indicating or signalling device is regulated or set to operate by reference to the relationship between instantaneous flux values, as disclosed for example, by inspection of oscillographic wave form images of a differential secondary output. In the latter case selection, i. e. co-relation of a given wave form image with a given property of the test piece, is a mental process or one depending on sense reactions of the operator, whereas with my method and apparatus selection is, in effect mechanical or automatic.

A further object has been to provide a test apparatus wherein test results as to any selected property or properties are disclosed directly by an indicating or signalling device cooperatively related to a single induction system comprising one primary and one secondary and without the use of an oscillograph. In this respect, my invention differs from that embodied in methods and/or apparatus in which test results are obtained by comparing the specimen with a standard, as by using two transformers or induction devices simultaneously and observing the irregularities in the wave form images of induced differentials. With my single induction system, there is no harmful heating to modify the test indications; and since the reading or indication in each case is absolute, there is no danger of error due to mingled effects, as in differential methods. Moreover, since the harmonic selected for observation in any instance can be filtered out of the secondary output, whatever the phase relation between said output and the magnetizing current, no difficulty, as frequent or unexpected need for recalibration, is experienced in testing specimens of the same generic class, as iron, copper, brass, nickel, Monel, etc., even though the specimens vary in composition, treatment, or the like. In other words, where the test pieces are of the same generic class of material, the selectiveness of my apparatus is a constant inherent function which operates automatically, unaffected by and independently of phase variations.

It will be understood that the segregated quantitative test effect related to any selected property or characteristic may be employed not only to operate signals or marking devices but also to control instrumentalities which in their operation effect variation of the extent or degree to which such selected property exists or is developed in the specimen. An example is in the heat treatment of metal objects in the form of rods, strips, wire or other suitable shapes, where variations in the property of hardness due to variations in the amount of heat applied to the specimen, may be utilized to control suitable feeding or heating devices or both.

In general, a magnetic testing method according to my invention includes the steps of exposing a test specimen in the field of a magnetic induction device, determining by the use of suitable selective instrumentalities which of various harmonics of the induced secondary current is or are present, or whether or not a harmonic is present which is due to the occurrence of a selected property in the specimen, and then measuring the value of the current component represented by a given harmonic, and/or employing such current component to control or actuate signals, marking devices, other control devices or the like. One form of apparatus suitable for practicing said method includes a single induction device having a primary and a secondary, suitable filtering instrumentalities in the secondary circuit, and measuring, indicating or controlling instrumentalities adapted to cooperate with the filters. One form of apparatus embodying my invention and which I have found effective in practicing my improved testing method is described in the following specification and illustrated in the attached drawing, of which—

Figure 1 is a diagram of an arrangement of circuits, and

Figure 2 a diagram showing operative control connection between test apparatus and signalling or marking devices and the like.

Referring to the drawing, my test device includes a single primary coil 1 within or within the field of which is located a secondary coil 2. A bar, rod, or other suitably shaped test piece 3 to be tested is placed in or moved through said coils 1 and 2 or positioned in the field thereof, primary coil 1 being energized from a source of sine wave current of suitable frequency, as 60 cycles. A 60 cycle filter 4 is interposed in the secondary circuit and calibrated to filter out the first harmonic or fundamental and to pass all other components of the induced secondary current. Additional filters as 5, 7, 9 etc. are provided, depending on the extent to which harmonics of higher frequency will be likely to be involved in prospective testing operations. In the arrangement shown in Figure 1, the several filters 5, 7, 9 may be arranged and calibrated to pass current components related to any desired harmonics, as the 5th, 7th and 9th respectively. Each filter controls a separate circuit and is separately connectable to a tube voltmeter 10. In view of the relatively small values of the currents related to the higher frequency harmonics as compared to the fundamental, a highly sensitive voltmeter is preferred, such for example, as one having practically no internal resistance other than that presented by the grid of the tube. The input terminals or posts of voltmeter 10 are shown at 11 and 12, and the output terminals or posts at 13 and 14. A battery 15, or other suitable source of direct current, is employed to energize the voltmeter tube circuit, not shown; and a pointer 16 is mounted to operate in the usual way in relation to a calibrated scale 17.

In the hook up shown in Figure 1, the 60 cycle or fundamental filter 4 has terminals 18 and 19 which may be connected selectively by suitable means, as a switch 20, with the input terminals as A, B, C, etc. of any desired number of separate filter circuits, as the three shown and which include the filters 5, 7 and 9 respectively representing, for this particular illustration, the 5th, 7th and 9th harmonics, respectively. The output terminals X, Y, Z, etc. of the several filter circuits shown are connectable by a switch 21 with terminals 22 and 23 which in turn are connected to the input terminals or posts 11 and 12 of the voltmeter 10.

Connections in the voltmeter 10 are so arranged that the output of any one of the filter circuits may be measured; or if desired, the output of any of said circuits either singly or combined by suitable switch means not shown, may be shunted around the voltmeter to amplifying or other devices for purposes hereinafter to be set forth and explained. To measure the value of current in the A—X circuit, for example, when a test specimen is in the field of primary 1, switches 20 and 21 are thrown to close said circuit. A voltmeter switch represented by a thumb piece 24 connects circuit A—X with the voltmeter coil; and a switch represented by thumb piece 25 cuts the battery 15 into the grid circuit of the voltmeter tube. The drawing shows the parts in voltmeter operating position, but with switches 20 and 21 open.

To connect the output of circuit A—X direct to terminals 13 and 14, thus shunting around the voltmeter coil, the thumb pieces 24 and 25 are turned to "out" position, indicated in dotted lines, thus effecting a corresponding switch motion to produce the desired change of circuit connections, as will be readily understood.

The instrumentalities thus far described provide effective apparatus more particularly adapted to disclose the identity of the harmonic or harmonics which will be significant or of interest in production tests. Thus, with a test piece in the field of primary 1 and with the switches 20 and 21 closing the A—X circuit, the voltmeter 10 will indicate the presence or absence of current components related to the 5th harmonic in excess of the value of that particular component in the fundamental which has been filtered out by filter 4. Similar observations will be made successively on voltmeter 10 in respect to the presence of current in circuits B—Y and C—Z and/or others if desired. By separately testing in this manner, the extent to which various properties occur at any given portion of the test piece is ascertained. Assuming that the 9th harmonic is the one which reacts to the presence of pipes or segregations occurring in substantial continuity, the extent to which this defect occurs in various parts of the test piece, as a rod for example, is indicated by observing the deflections of the pointer of voltmeter 10 with switches 20 and 21 closed in the C—Z circuit, when the rod or other specimen is moved through or positioned in the field. Incidentally the procedure hereinabove described affords an effective method for selecting a standard to be used in a differential testing method, if desired. It will be apparent that similar observations may be made in respect to the presence or absence of other harmonics, and therefore of other properties.

The form of apparatus shown in Figure 1 combined with that shown in Figure 2, is also effective in production where the testing is directed more especially to locating and marking the place or places in the product, as rods, strips, welds, tubes, etc. at which a certain property occurs at all or in excess of some predetermined maximum amount or degree. Accordingly, production apparatus, as distinguished from laboratory apparatus, preferably includes signalling and/or marking devices as well as instrumentalities which can be employed to effectively calibrate and actuate controls for said marking and/or signalling devices, to cause or permit them to operate upon the occurrence of a predetermined value of current passed by any one of the filters 5, 7 and 9 and/or others if desired.

It will be apparent that, in many cases, the output of circuits A—X, B—Y, C—Z etc., respectively, will be too small to be employed satisfactorily for direct control or actuation of signals, or the like, except perhaps with extremely sensitive instruments which are likely to be expensive, fragile and difficult to maintain in condition. Accordingly, I provide an amplifier 26 connected to the output terminals 13 and 14 of the voltmeter 10 and to a source of 110 v., A. C. supply.

A visual record of fluctuation in the amplified voltage is afforded by a recording potentiometer 27 which may be cut into and out of the amplifier output circuit by means of a switch 28. The record so produced is useful in approximating the constants to be employed in signal control devices as well as in disclosing what order of amplification will be required in view of the maximum and minimum voltages recorded in preliminary tests of a typical specimen or specimens.

In commercial or production practice, the usual object of a magnetic test is to find out whether a product is or is not acceptable for a given purpose. Its fitness or unfitness may depend upon the extent to which it has or lacks a given property or properties. Accordingly, I have shown in Figure 2 one embodiment of signalling and marking apparatus adapted to cooperate with the testing instrumentalities hereinabove described.

If the pieces to be tested are elongated, as tubes, rods, strips or the like, it will be preferable to mark those portions thereof in which undesirable properties are detected or exist to more than some predetermined maximum extent. This is conveniently done by a suitable marking device such as an abrading roller or marker 29 mounted to ride freely over the surface of those portions of the test piece which are normal or acceptable for the contemplated use of the piece and to be actuated so as to produce an abrasion or marking on the surface of those portions of the test piece as to which a defect or variation is detected by the test instruments. In the illustrated apparatus, the marker 29 is actuated at such times by a motor 30 in a circuit controlled by a switch 31, normally held in open position, as shown, by compression spring 32. A lamp 33 also in the motor circuit gives a visible signal when switch 31 is moved to circuit closing position. This lamp or a buzzer or other source of a sensible manifestation may be employed independently of the marker 29, if desired, where the specimen pieces are short or are at rest when inspected.

To be effective more particularly in testing practice involving moving strips, rods or the like, the marking devices should be so controlled that marking or abrading operation thereof will start substantially simultaneously with the beginning of the occurrence of a current condition in the secondary due to the presence or absence of a selected property to a predetermined degree in that portion of the specimen positioned in the magnetic field, and will stop substantially simultaneously with the end of the occurrence of said current condition. For example, in testing a long billet for pipes or extended segregations, it is important that the beginnings and ends of defective parts be accurately located so that such parts may be cut out with some certainty not only that the remaining parts are sound but also that the cut out parts do not contain excessive amounts of sound stock. Accordingly, the switch 31 is actuated by a relay 34 which is energized immediately upon the occurrence of a predetermined critical current condition in the secondary 2 and hence in the output of amplifier 26, and is as promptly de-energized when the critical current condition ceases.

Various instrumentalities may be employed for this purpose; but the arrangement shown diagrammatically in Figure 2 provides not only superior speed and certainty of control over other available known control expedients and therefore permits rapid testing, but also has the further advantage of relative compactness and simplicity. As illustrated, it includes a General Electric F. G. 98 thyratron tube 35 with plate and filament terminals operatively arranged in the circuit of relay 34. The thyratron grid circuit includes the output of a rectifier 36 which is connected to amplifier 26. A battery, or equivalent device, 37 provides the grid bias; and a relatively small A. C. voltage is superimposed on the D. C. grid energizing voltage by means of a transformer having a secondary 38, said superimposed A. C. voltage being in a nearly 90° phase relation to the plate voltage i. e. the relay operating voltage. This phase angle is maintained by the combined action of the resistance 39 and the capacitance 40. Control or adjustment of the effective plate voltage is obtained by a variable resistor 41, and, of the combined D. C. and superimposed A. C. voltages in the grid circuit, by a variable resistor 42.

The thyratron 35 in the above described apparatus is in effect a switch in the circuit of relay 34, and is "triggered" i. e. opened and closed or operated on and off, by the occurrence of predetermined current conditions in the grid circuit. Thus, in operation of the apparatus of Figures 1 and 2 as a whole and with a test piece in the primary 1, the filters 4 and 5, 7, or 9, as the case may be, eliminate from the output of secondary 2 all but the excess of a predetermined desired harmonic. The component of said filtered secondary which corresponds to said harmonic and therefore to some selected property of the test piece is boosted in the amplifier 26; and its amplified output passes to rectifier 36 which produces the D. C. voltage for "triggering" the thyratron 35 through the grid connection above described. One purpose in rectifying the amplified harmonic component is to make the thyratron tripping point independent of the phase relation of the harmonic to the plate voltage. The superimposed A. C. grid voltage from transformer secondary 38, at phase angle of nearly 90° to the plate voltage, combined with the D. C. grid voltage, causes the thyratron to trip early in a half cycle and thus supply the relay circuit with a more than ¼ cycle closed period which reduces chattering of the relay.

When thyratron 35 is "triggered" it closes the relay circuit and operates motor 30 and/or lamp 33. When the D. C. output rectifier 36 falls below a predetermined voltage, thyratron 35 promptly "triggers" again to open the circuit of relay 34, thus opening the motor and lamp circuits.

I claim—

1. Apparatus for magnetic testing comprising a single primary coil, a secondary coil in the field thereof, and filtering means in the circuit of said secondary coil comprising a filter for intercepting the fundamental component of current in said secondary and a separate filter for passing only a single selected harmonic component of said secondary current.

2. Apparatus for magnetic testing comprising a single primary coil, a secondary coil in the field thereof, filtering means in the circuit of said secondary coil adapted to pass only that component of the whole secondary output which has a frequency known to be related to the presence or absence of a property and/or a condition of the specimen under test, and means responsive to said filtered component for controlling the operation of a signalling or marking device or the like.

3. Apparatus for magnetic testing comprising a single primary coil, a secondary coil in the field thereof an amplifier for the output of said secondary coil, filtering means interposed between said coil and said amplifier and adapted to pass only that component of said output having a frequency related to the presence or absence of a property or condition of the specimen under test, and means for switching a portion of said filtering means into and out of the secondary circuit.

4. Apparatus for magnetic testing comprising a single primary coil, a secondary coil in the field thereof, signal means for indicating the presence or absence of a predetermined current condition in the secondary, means connected to said secondary for controlling actuation of said signal means, and filtering means arranged and adapted to pass to said controlling means only that component of the secondary output which has a frequency related to the presence or absence of a selected property or condition of the specimen under test.

5. Apparatus for magnetic testing as claimed in claim 4, and including an amplifier operatively arranged in relation to the secondary output.

6. Apparatus for magnetic testing as claimed in claim 4 and wherein the signal control means includes a thyratron tube having a grid circuit operatively connected to said secondary.

7. Apparatus for magnetic testing as claimed in claim 4, and wherein the filtering means includes instrumentalities operatively positioned to intercept only that component of the secondary output related to the fundamental harmonic and instrumentalities operatively positioned to pass only that other component of the secondary output which has a frequency related to said selected property or condition of said specimen.

8. Apparatus for magnetic testing as claimed in claim 4 and wherein the filtering means includes separate instrumentalities presenting different filtering constants to pass current components of different frequencies, and means for selectively interposing said separate instrumentalities in the secondary circuit.

9. Method of testing in a magnetic field which includes exposing a specimen to be tested in the secondary coil of an induction device of which the primary coil is energized by an A. C. sine wave current, filtering out the sine wave portion of the current induced in said secondary, and filtering out all of the remaining secondary current except that component thereof which is produced by a predetermined harmonic known to be related to a selected property or characteristic of the material under test.

10. Method of testing in a magnetic field which includes exposing a specimen to be tested in the secondary coil of an induction device of which the primary coil is energized by an A. C. sine wave current, filtering out the sine wave portion of the current induced in said secondary, filtering out all of the remaining secondary current except that component thereof which is produced by a predetermined harmonic known to be related to a selected property or characteristic of the material under test and effecting the operation of a signalling or marking device or the like upon the occurrence of a value of said component greater or less than a predetermined value thereof.

11. Method of magnetic testing which includes subjecting a specimen to magnetization in a single A. C. field, deriving from said field a composite secondary made up of a fundamental and harmonics thereof related severally to different properties and/or conditions of the specimen, filtering the fundamental out of said secondary, and then filtering the remainder of said secondary, to pass only that component thereof which is related to a selected harmonic.

12. Method of magnetic testing according to claim 11 and wherein the passed harmonic component of the secondary is rectified and said rectified component is employed to control operation of signalling devices or the like.

13. Method of magnetic testing which includes exposing a plurality of specimens separately to magnetization in a single magnetic field produced by an effective magnetizing current, deriving an induced secondary from said field during magnetization of each specimen, filtering out in respect to each specimen the fundamental component of the induced secondary, subjecting the remainder of said secondary successively to filtering to pass, one at a time, only those components thereof which are related to certain predetermined harmonics of the magnetizing current, noting indications of the presence or absence of said current components in the secondary in relation to each of said separate filterings thereof, marking said specimens upon the occurrence of said indications, subjecting the marked portions of said specimens to manipulative forces to disclose the presence or absence of various properties and/or conditions thereof, and corelating said indications of the presence or absence of secondary components related to said predetermined harmonics with the observed results of said manipulative forces.

14. Method of magnetic testing according to claim 13 and including the further steps of observing the value of a harmonic component of the secondary produced when a specimen suitable for a given purpose is exposed in said field and then calibrating signal control devices to operate on the occurrence in said secondary of said harmonic component to a predetermined value or extent when other specimens are similarly exposed in said field.

15. Apparatus for magnetic testing according to claim 1 and wherein a plurality of separate filters are provided each of which is adapted to pass only a single selected harmonic component of said secondary current.

SIGFRID SPECHT.